United States Patent
Schulte

(10) Patent No.: US 7,637,286 B2
(45) Date of Patent: Dec. 29, 2009

(54) ABSORBER FOR A PIPE CONSTRUCTION OR SEWER CONSTRUCTION AND PIPE OR SEWER CONFIGURATION PROVIDED WITH THE ABSORBER

(76) Inventor: Joachim Schulte, Im Langen Hahn 26, Lüdenscheid (DE) D-58515

( * ) Notice: Subject to any disclaimer, the term of this patent is extended or adjusted under 35 U.S.C. 154(b) by 0 days.

(21) Appl. No.: 11/805,143

(22) Filed: May 22, 2007

(65) Prior Publication Data
US 2007/0221361 A1    Sep. 27, 2007

Related U.S. Application Data

(63) Continuation of application No. PCT/EP2005/055986, filed on Nov. 15, 2005.

(30) Foreign Application Priority Data
Nov. 22, 2004    (DE) .................. 20 2004 018 084 U

(51) Int. Cl.
*F15D 1/02* (2006.01)
(52) U.S. Cl. ........................... 138/38; 138/98; 138/108; 138/115; 165/53; 405/150.1; 405/184.2
(58) Field of Classification Search .................. 138/38, 138/98, 108, 115; 165/53; 405/150.1, 184.2
See application file for complete search history.

(56) References Cited

U.S. PATENT DOCUMENTS

| | | | | | |
|---|---|---|---|---|---|
| 3,246,689 | A | * | 4/1966 | Remde et. al. | 165/53 |
| 5,072,622 | A | * | 12/1991 | Roach et al. | 73/40.5 R |
| 5,480,260 | A | * | 1/1996 | Shattuck et al. | 405/36 |
| 6,712,556 | B2 | * | 3/2004 | Penza | 405/183.5 |
| 6,776,222 | B2 | * | 8/2004 | Seki et al. | 165/56 |
| 7,021,338 | B2 | * | 4/2006 | Berry, Jr. | 138/108 |
| 7,025,580 | B2 | * | 4/2006 | Heagy et al. | 425/11 |
| 2003/0034080 | A1 | * | 2/2003 | Second | 138/115 |
| 2004/0146362 | A1 | * | 7/2004 | Penza | 405/184.4 |
| 2006/0027356 | A1 | * | 2/2006 | Sulzer | 165/53 |

FOREIGN PATENT DOCUMENTS

| | | |
|---|---|---|
| DE | 36 07 207 A1 | 9/1987 |
| DE | 197 19 311 A1 | 12/1997 |
| EP | 1 215 460 A2 | 6/2002 |
| JP | 2002-348942 | 12/2002 |

* cited by examiner

*Primary Examiner*—James F Hook
(74) *Attorney, Agent, or Firm*—Laurence A. Greenberg; Werner H. Stemer; Ralph E. Locher

(57) ABSTRACT

An absorber for a pipe or sewer structure has at least one feed connection and at least one return connection. One or more absorber channels connect a feed to a return stub. The absorber channels of the absorber are combined in an absorber channel mat to form a physical unit, and the absorber channel mat is made of a material having flexible properties, at least while it is being laid in the pipe or sewer structure.

14 Claims, 2 Drawing Sheets

ABSORBER FOR A PIPE CONSTRUCTION OR SEWER CONSTRUCTION AND PIPE OR SEWER CONFIGURATION PROVIDED WITH THE ABSORBER

CROSS-REFERENCE TO RELATED APPLICATION

This is a continuation, under 35 U.S.C. § 120, of copending international application PCT/EP2005/055986, filed Nov. 15, 2005, which designated the United States; this application also claims the priority, under 35 U.S.C. § 119, of German application DE 20 2004 018 084.7, filed Nov. 22, 2004; the prior applications are herewith incorporated by reference in their entirety.

BACKGROUND OF THE INVENTION

Field of the Invention

The invention relates to an absorber for a pipe or sewer structure comprising at least one feed connection and at least one return connection and one or more absorber channels that connect a feed to a return. The invention also relates to a pipe or sewer structure comprising such an absorber.

Various heat exchanger installations have been disclosed by way of which heat contained in the wastewater can be recovered, for example to supply the heat recovered from the wastewater into a district heating network. German utility model DE 20 2004 005 768 U1 describes a component for channeling water which has a recess in its bottom region. The recess extends over the entire length of the component and serves to accommodate a plurality of juxtaposed square metal pipes intended to form a heat exchanger device (absorber). These metal pipes are arranged in the recess in a grout which, following insertion of the pipes, is poured into the gaps which remain in particular between the individual pipes. By virtue of the metal pipes held in the recess by means of the grout, the recess itself is eliminated again, with the result that the component, in particular when it is embodied as a pipe, does not have its cross-sectional area reduced by the absorber. The pipes inserted in the recess are interconnected at their ends by connecting pieces such that liquid which is fed in from a feed and used for conveying heat is channeled through the pipes and is carried off by a return. The feed and the return are conveniently situated in a manhole. The component known from this document serves to recover heat from the wastewater channeled through the component. The cooler liquid fed into the bottom region of the component via the feed is heated as it flows through the heat exchanger device by the warmer wastewater channeled over the absorber. The recovered heat is delivered via a heat pump connected to the return so that it can be used subsequently.

Finally, the component with its absorber described in this document is one in which, unlike the sewer pipe described in German published patent application DE 35 21 585 A1, the heat exchanger device is integrated subsequently into the pipe wall and not during the construction of the sewer pipe.

To achieve the best possible heat transfer from the wastewater to the pipes of the heat exchanger device, metal pipes are used in this already known heat exchanger device. Although these pipes have good thermal conductivity, the disadvantage with these pipes is that the individual pipes have to be welded together at their ends to form relatively long heat exchanger devices. Moreover, such pipes are not suited for use in existing sewer structures, in particular in those which do not have a recess in their bottom region. Existing sewer structures often have damage, edges or discontinuities which impede the installation of such a heat exchanger device, and such installation can only be achieved with considerable extra expenditure.

German patent DE 197 19 311 C2 describes a further heat exchanger device for installation in a sewer pipe. The installation of that prior art heat exchanger device with its absorber in an existing sewer pipe considerably reduces the free cross-sectional area in the bottom region of the pipe. Furthermore, such an installation unit which significantly increases the bottom region forms a step within the sewer, this again being undesirable. Finally, in that prior art heat exchanger device, too, the same disadvantages arise as described with respect to the above noted German utility model DE 20 2004 005 768 U1.

SUMMARY OF THE INVENTION

It is accordingly an object of the invention to provide an absorber for recovering heat from water-carrying conduits or pipes, for example sewer pipes, which overcomes the above-mentioned disadvantages of the heretofore-known devices and methods of this general type and also to propose a pipe or sewer structure suitable for recovering heat.

With the foregoing and other objects in view there is provided, in accordance with the invention, an absorber for a pipe or sewer structure, comprising:

at least one feed connection;
at least one return connection;
one or more absorber channels fluidically connected between the feed connection and the return connection. The absorber channels extend through an absorber channel mat forming a physical unit. The absorber channel mat is made of a material having flexible properties, at least while the absorber channel mat is being laid into the pipe or sewer structure.

This object is achieved according to the invention by a generic absorber mentioned in the introductory part in which the absorber channels of the absorber are combined in an absorber channel mat to form a physical unit, and the absorber channel mat is made of a material having flexible properties at least while it is being laid in the pipe or sewer structure. A pipe or sewer structure according to the invention comprises such an absorber, the absorber being arranged in the bottom of the structure and being held in this position by a tube which is drawn into the structure and lines the inner side of the structure.

In the absorber the individual absorber channels are combined to form a physical unit. This physical unit is configured as a flexible absorber channel mat, with, in principle, the flexible properties of the absorber channel mat needing initially to be present only while it is being laid in a pipe or sewer structure. By contrast, the flexible properties of the absorber channel mat are not required in principle for operation of the absorber. Therefore, the absorber channel mat can retain its flexible properties even after being installed in a pipe or sewer structure. It is equally possible for the flexible material properties of the absorber channel mat to disappear after it is laid, for example by a hardening process or the like. The flexible properties of such an absorber channel mat in which the individual absorber channels are combined to form a physical unit make it easy to mount the absorber channel mat. For example, it can be drawn into an existing pipe or sewer structure, thus making it possible in particular for it to be installed even in pipes or sewers having a smaller diameter. Owing to the flexible properties of the absorber channel mat, edge discontinuities or the like within an existing pipe or sewer structure can be readily bridged. As a result of these material properties, the absorber channel mat lies flat on the upper side of the bottom of the pipe or sewer structure. After being drawn in/laid within such a structure, the absorber channel mat bears snugly by its underside on the bottom of the structure, in particular without additional measures having to be taken in principle for this purpose. The fact that the absorber channel mat bears snugly has the advantage of then establishing heat transfer from the structure in its bottom region to the absorber channel mat, and in particular to the heat exchanger liquid conveyed in the absorber channels. Such heat transfer is desirable since it is thus also possible to recover heat from the ground near the surface via the absorber. To achieve better compensation for uneven areas in the bottom region of a pipe or sewer structure, provision is made according to one embodiment of the invention for the underside of the absorber channel mat to have not only flexible properties but also resilient properties. Uneven areas, small stones or the like thus press into the underside of the absorber mat and in this way avoid the formation of relatively large regions in which the absorber channel mat does not bear by its underside on the bottom of the structure.

In such an absorber mat, the at least one absorber channel advantageously has a meandering course between its feed and its return. Such an absorber mat can be formed either in one piece or from an assembly consisting of a plurality of individual pieces. In the latter case, a central piece can be provided for example in which individual absorber channel sections are arranged so as to extend parallel to one another. The central piece of such an absorber channel mat can be produced in an endless form and thus unrolled in situ from a roll when being drawn into a pipe or a sewer. Not only does this allow the formation of absorbers of variable length, but such a central piece also makes it possible in particular for long absorber runs to be formed. Two end pieces are used to connect the individual absorber channel sections of such a central piece, these end pieces advantageously being made of the same material as the central piece of the absorber channel mat. The end pieces are designed to interconnect absorber channel sections which extend adjacent to one another and to the longitudinal extent of such a central piece in order to provide a single absorber channel or else a plurality of parallel absorber channels having a meandering course. One of the end pieces of such an absorber mat additionally comprises both one or more feed connections and one or more return connections. The number of feed and return connections is governed by the number of absorber channels which are to be operated independently of one another. To line a pipe or sewer, it is also readily possible for a plurality of absorber channel mats to be arranged so as to extend next to one another. With the provision of a plurality of channels extending parallel to one another in such an absorber mat, according to another operating mode the flow through these channels can also take place with all the channels pointing in the same direction, in which case a feed connection is arranged at one end of such an absorber channel mat and a return connection is arranged at the other end. Such an arrangement of the feed and return connections will be used in particular if the absorber channel mat has only a single channel.

Such an absorber channel mat has only a relatively small height. Nevertheless, it is advantageous for such an absorber channel mat to be provided at its longitudinal and transverse edges with outwardly tapering lips as transition pieces for joining the surface facing into the interior of the pipe or sewer to the pipe or sewer wall.

According to a further embodiment, provision is made for the absorber channel mat to have a planar underside and a corrugation extending in the transverse direction to the wastewater flow direction. The absorber channel or its absorber channel sections is or are formed within the elevations of the corrugation. This measure serves the purpose of increasing that surface of the individual absorber channel sections which faces into the interior of the pipe or sewer structure.

The absorber can be produced from various materials as long as the above-described properties are present. For example, various plastics or else rubber mixtures are suitable for forming the absorber channel mat. Should such an absorber channel mat be composed of a plurality of pieces, the individual elements can be connected to one another by adhesive bonding, welding, vulcanizing or by a plug connection.

The above-described absorber or its absorber channel mat is especially suitable for equipping existing pipe and sewer structures, in particular if these are in need of repair anyway and are repaired by drawing in a hardening tube (inliner). When carrying out such a repair, it is readily possible for the absorber or its absorber channel mat to be drawn in at the same time as such an inliner is drawn in to line the inner wall of the structure. The inliner used for repairing the pipe or sewer hardens after it has been drawn in and thus ensures that the absorber is secured at its intended position in the bottom region of the structure. Moreover, the inliner virtually clamps the absorber channel mat between the outer side of the inliner and the inner side of the structure, and therefore this measure also ensures that the underside of the absorber channel mat bears snugly against the upper side of the bottom. Owing to the flexible properties of the inliner, the latter bears readily against the upper side of the absorber channel mat with full surface contact, even if the absorber channel mat is corrugated with respect to the inner side of the pipe or sewer structure in the above-described manner. This structuring of the absorber channel mat is thus reproduced through the repair tube, with the result that the desired increase in the absorber channel surface is preserved.

According to a further exemplary embodiment, the absorber channel mat described forms part of such an inliner intended for the repair of a pipe or sewer structure and, for example, is woven during its production into this inliner or else is subsequently laminated onto the inliner. This has the advantage that, when repairing the pipe or sewer structure, the absorber channel mat is introduced into the structure at the same time as the inliner is drawn in. If the absorber channel mat forms part of such a plastic inliner used for repairing the pipe or sewer structure, the walls forming the absorber channels, at least in terms of the properties which keep the channels open, can be assumed by the inliner itself. It should then be ensured that after the inliner has been drawn in and before it has hardened, the absorber channels are kept open until the tube has hardened, for example using compressed air or the action of liquid.

In the case of a protective sheet (preliner) being drawn in below such a repair tube (inliner), the absorber channel mat can also form part of this protective sheet inliner and be drawn in therewith into the pipe or sewer structure.

In the case that not only the absorber channel mat but also an inliner used for repairing the pipe or sewer structure, if appropriate together with a preliner, are to be introduced into the structure, the absorber channel mat will be arranged to suit the preferred heat recovery in the particular circumstances. If recovering heat from the surrounding ground is the main concern, the absorber channel mat will be arranged under the liner or liners and thus advantageously directly adjoining the inner side of the pipe or sewer structure to be repaired. If, by contrast, recovering heat from the wastewater is the main concern, it will be considered to bring the absorber channel mat as close as possible into the region of the wastewater. Irrespective of the two possible arrangements described above by way of example, it will be understood that heat exchange into the heat exchanger fluid carried in the absorber channels occurs in any event both from one side and from the other side.

According to a further embodiment of the invention, it is proposed that at least two absorber channel mats be arranged so as to lie one above the other, for example also in such a way that their absorber channels are arranged with an offset to one another. In such an embodiment, provision can be made for example for an inliner intended for repair to be arranged between the two absorber channel mats.

Even if the choice of the material used to form the absorber channel mat and, in addition, the possible use of a repair tube mean that the heat transfer from the wastewater to the heat exchanger medium, for example water, carried in the absorber channels has poorer values under certain circumstances than when metal pipes are used, the advantages afforded by this absorber predominate nevertheless. Such a drawback can be readily overcome by correspondingly increasing the length of the absorber, which, as described above, is again readily possible.

The above description of the absorber was given by way of an example in which heat from the ground and/or from the liquid flowing in the pipe or sewer structure is recovered via the absorber. It is also readily possible for the absorber to be operated in reverse, so that heat is released via this absorber into the ground and/or to the liquid flowing in the structure. Within such an embodiment, the absorber can form part of an air-conditioning device, for instance for a building. It is likewise possible for the absorber to be operated alternately in one or other of the above-described operating modes.

Other features which are considered as characteristic for the invention are set forth in the appended claims.

Although the invention is illustrated and described herein as embodied in absorber for a pipe construction or channel construction and pipe construction or channel construction provided with this absorber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
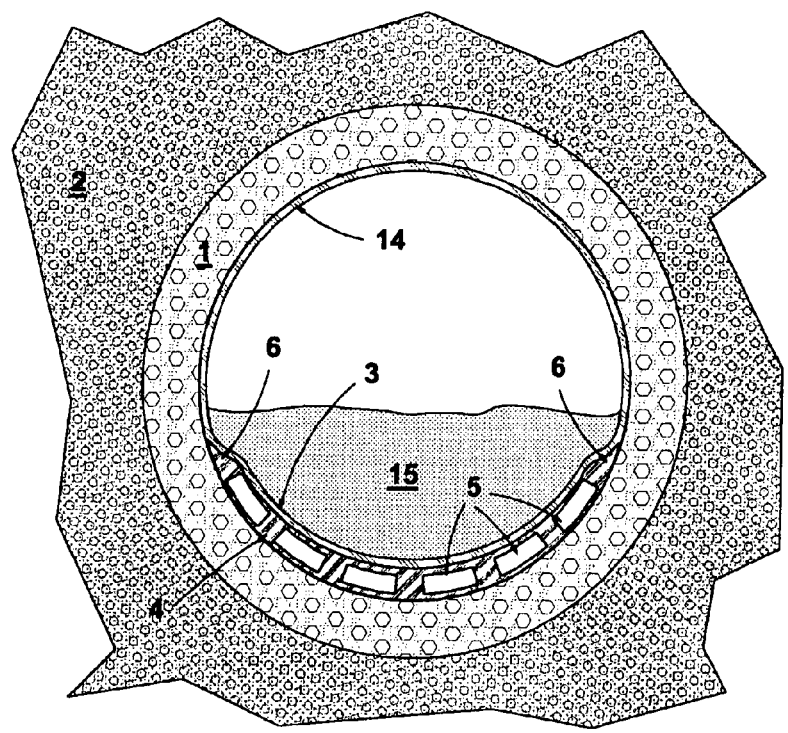
FIG. 1 is a schematic cross section taken through a sewer pipe extending in the ground, with an absorber according to a first embodiment of the invention installed in a bottom region of the pipe.

Referring now to the figures of the drawing in detail and first, in particular, to FIG. 1 thereof, there is illustrated a sewer pipe 1 laid in the ground 2. The sewer pipe 1 comprises an absorber 3 which is arranged in the bottom region, or the floor, of the sewer pipe 1. The absorber 3, which may also be referred to as a heat exchanger, comprises a plurality of absorber channel sections 5 which are combined in an absorber channel mat 4. The longitudinal-side ends of two adjacent absorber channel sections 5 are in each case alternately interconnected so that in each adjacent absorber channel section 5 the liquid introduced therein via a feed flows in the opposite direction. The absorber channel mat 4 is provided at its longitudinal and transverse sides with respective transition lips 6 in order to form a gradual transition from the inner surface of the sewer pipe 1 to the upper side of the absorber channel mat 4, thereby avoiding the formation of steps. The absorber 3 and, in particular, its absorber channel mat 4 are made of a flexible material, for example a rubber mixture or the like.

Figure 2:
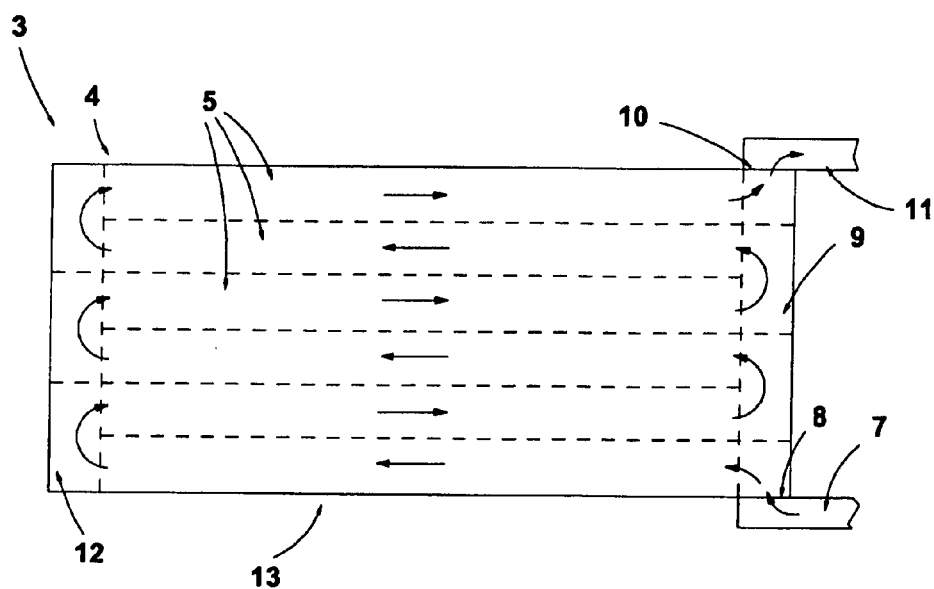
FIG. 2 is a schematic plan view of the absorber of FIG. 1.
Figure 3:
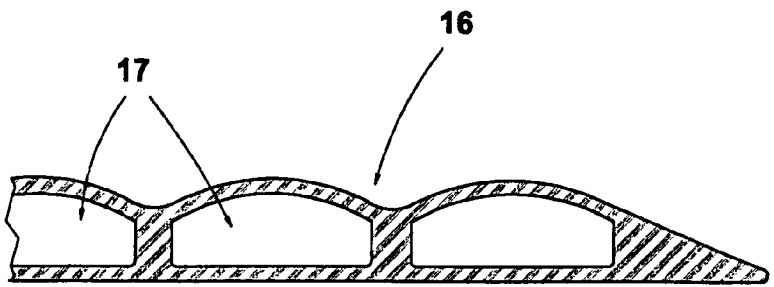
FIG. 3 is a cross section of a further embodiment of an absorber channel mat according to the invention.

The absorber 2 is shown in a schematic plan view (FIGS. 2 and 4) and an inside view (FIG. 3). The flow direction of the heat exchanger medium, for example water, is indicated therein by arrows. The absorber 3 comprises a feed 7, or supply stub 7, which is connected via a feed connection 8 of an end piece 9. The end piece 9 interconnects adjacent absorber channel sections 5. Furthermore, a return 11 is connected to the end piece 9 at its return connection 10. In a manner which is not shown in more detail, the feed 7 and the return 11 are guided out of the ground 2 through a manhole connecting the sewer pipe 1 to the surface and are coupled to a heat pump. The absorber channel mat 4 is provided at its end situated opposite the end piece 9 with a further end piece 12 by means of which, in turn, adjacent absorber channel sections 5 can be interconnected, so that the absorber channel mat 4, which, in the exemplary embodiment represented, is composed of the two end pieces 9, 12 and a central piece 13 forming the absorber channel sections 5, forms a single absorber channel which extends between the inlet 7 and the return 11.

In the exemplary embodiment represented in FIG. 1, the absorber 3 or its absorber mat 4 has been drawn into the sewer pipe 1 which forms part of an existing sewer pipe system. To secure the absorber channel mat 4 in the bottom region of the sewer pipe 1, use is made of an inliner 14 which lines the inner side of the sewer pipe 1 and which is hardened after being drawn into the sewer pipe 1. Techniques for drawing in and hardening such an inliner 14 are sufficiently well known. In the exemplary embodiment represented here, the inliner 14 also serves at the same time for the repair of the sewer pipe system with its sewer pipe 1. Thus, not only is the sewer system repaired on its inner side by drawing in the inliner 14, but the absorber 3 is also secured at the same time. Furthermore, the inliner 14 protects the absorber channel mat 4 from direct contact with the wastewater 15 carried in the sewer pipe 1. When installing the flexible absorber 3 in a sewer pipe 1 in the manner described with respect to FIG. 1, the absorber 3 does thus not necessarily need to have wastewater-resistant properties. These properties are possessed by the inliner 14 which separates the absorber channel mat 4 from the wastewater 15.

The flexible properties of the absorber channel mat 4, in which respect the underside of the absorber channel mat 4 is additionally resilient in the exemplary embodiment represented, cause the underside to bear snugly and with full-surface contact against the inner side of the sewer pipe 1 without additional binders having to be used. The absorber 3 can thus be used to absorb heat from the wastewater 15 and from the sewer pipe 1. Although such an absorber 3 will generally be provided in the sewer pipes of a residential area, in which pipes the wastewater ought normally be warmer than the temperature of the surrounding ground 2 and of the sewer pipe 1, the absorber 3, by virtue of its virtually full-surface contact with the pipe 1, can also be used on those sections of pipe which carry cooler wastewater so as then to absorb heat from the ground. Typically, sewer pipes are installed in the ground to a depth of 2-3 m, which means that ground heat can be recovered in this way particularly in the cooler winter months.

FIG. 3 illustrates a cross section through a further absorber channel mat 16 which has the same basic construction as the absorber channel mat 4 of FIG. 1. Unlike the absorber channel mat 4, the mat illustrated here is formed with an upwardly corrugated upper wall, that is, the individual absorber channel sections 17 are designed with a domed upper wall or a convex rounding, thereby increasing that surface of the absorber channel sections 17 which faces the wastewater.

Figure 4:
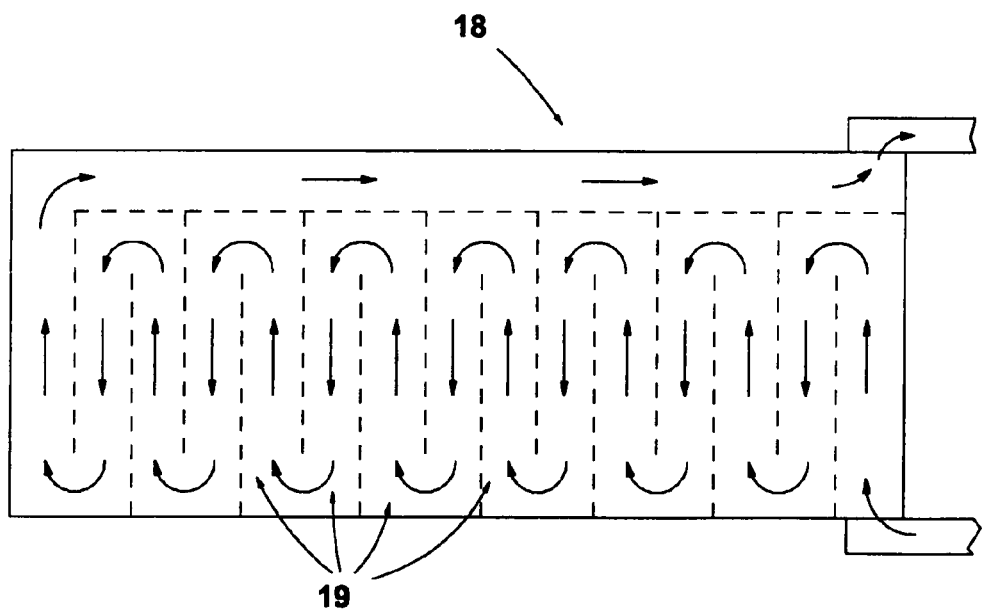
FIG. 4 is a schematic plan view showing a further embodiment of an absorber for a pipe or sewer structure according to the invention.

FIG. 4 shows yet a further absorber channel mat 18 whose absorber channel sections 19 extend transversely to the longitudinal extent of the absorber channel mat 18. The flow direction of the heat-exchanging fluid is depicted in this plan view, along a meandering course which, in this case extends chiefly transversely to the flow direction of the sewage. The meander of FIG. 2 extends chiefly in the direction of the sewage flow.

The absorber channel mats 4, 16, 18 described can be formed in one piece by an extrusion method or else in two pieces by two interconnected material layers. In the latter case, the sections which separate the absorber channel sections from one another form the connection points between the upper and lower material layer. If appropriate, use can be made of webs to increase the spacing between the upper material layer and the lower material layer or to provide the absorber channel mat with a smooth upper side and a smooth lower side.

The invention claimed is:

1. A pipe or sewer structure, comprising:
   an absorber disposed on a bottom of the pipe or sewer structure in a portion of the pipe or sewer structure to be repaired, said absorber including at least one feed connection and at least one return connection;
   one or more absorber channels containing water and fluidically connected between said feed connection and said return connection, said absorber channels extending through an absorber channel mat and forming a physical unit, and said absorber channel mat being made of a material having flexible properties at least while said absorber channel mat is being laid into the pipe or sewer structure;
   a drawable inliner tube formed of a hardening material hardened under compressed air; and
   said absorber being secured in the portion of the pipe or sewer structure to be repaired by the hardened inliner tube, as a result of, prior to the hardening of the hardening material, positioning said absorber at the portion and drawing the inliner tube over said absorber, such that, upon hardening, said absorber is secured to the pipe or sewer structure by the inliner tube lining the portion and a repair is effectuated.

2. The absorber according to claim 1, wherein said one or more absorber channels follows a meandering course between said feed connection and said return connection.

3. The absorber according to claim 2, wherein said absorber channel mat comprises a central piece with open-ended absorber channel sections extending parallel to one another, and two end pieces connected to said central piece, said end pieces connecting in each case two mutually adjacent open-ended said absorber channel sections, and one of said end pieces having said feed connection and said return connection.

4. The absorber according to claim 3, wherein an upper side of said absorber channel mat is corrugated in a region of said absorber channel sections, thereby increasing a surface of the individual absorber channel sections facing towards an interior of the pipe or sewer structure.

5. The absorber according to claim 1, wherein said absorber channel sections extend substantially parallel to a longitudinal extent of said absorber channel mat.

6. The absorber according to claim 1, wherein said absorber channel sections extend transversely to a longitudinal extent of said absorber channel mat.

7. The absorber according to claim 1, wherein said absorber channel mat comprises lips formed laterally at longitudinal sides thereof, said lips facing laterally outward and tapering outwardly.

8. The absorber according to claim 1, wherein said absorber mat is formed of at least two interconnected material layers forming therebetween said absorber channel or channels, and wherein connection regions between said two material layers define a separation of said absorber channel or channels.

9. The absorber according to claim 1, wherein a material forming an underside of said absorber channel mat has resilient material properties.

10. The pipe or sewer structure of claim 1, wherein the absorber channel mat forms part of the inliner.

11. The pipe or sewer structure of claim 10, wherein the absorber channel mat is at least one of woven into the inliner and laminated onto the inliner during formation of the inliner.

12. The pipe or sewer structure of claim 1, wherein the inliner is used for repairing the pipe or sewer structure.

13. A pipe or sewer structure, comprising:
   an absorber disposed on a bottom of the pipe or sewer structure, said absorber including at least one feed connection and at least one return connection;
   one or more absorber channels containing water and fluidically connected between said feed connection and said return connection, said absorber channels extending through an absorber channel mat and forming a physical unit, and said absorber channel mat being made of a material having flexible properties at least while said absorber channel mat is being laid into the pipe or sewer structure;
   an inliner tube formed of a hardening material hardened under compressed air, said inliner securing said absorber to the bottom of the pipe or sewer structure, after the hardening material hardens; and
   said absorber being drawn into the pipe or sewer structure at the same time as the inliner, prior to hardening of the hardenable material.

14. A method for forming a pipe or sewer structure, comprising the steps of:
   positioning an absorber on a bottom of the pipe or sewer structure in a portion of the pipe or sewer structure to be repaired, the absorber including:
      at least one feed connection and at least one return connection;
      one or more water containing absorber channels fluidically connected between the feed connection and the return connection, the absorber channels extending through an absorber channel mat and forming a physical unit, the absorber channel mat being made of a material having flexible properties at least while the absorber channel mat is being disposed into the pipe or sewer structure;

drawing an inliner tube formed of a hardening material in the pipe or sewer structure and over the absorber, to locate the absorber between the inliner tube and the pipe or sewer structure; and after the drawing step, hardening the inliner tube under compressed air to secure the absorber in the portion of the pipe or sewer structure to be repaired with the hardened inliner tube to line the portion effectuate a repair.

* * * * *